United States Patent [19]

Besik

[11] 4,353,800

[45] Oct. 12, 1982

[54] METHOD AND AN APPARATUS FOR BIOLOGICAL TREATMENT OF WASTE WATERS

[76] Inventor: Ferdinand Besik, 3243 Chokecherry Crs., Mississauga, Ontario, Canada, L5L 1B1

[21] Appl. No.: 181,136

[22] Filed: Aug. 25, 1980

[51] Int. Cl.³ .............................................. C02F 3/08
[52] U.S. Cl. .................................. 210/605; 210/617; 210/628; 210/629; 210/138; 210/151; 210/195.3; 261/80; 261/92
[58] Field of Search ............... 210/605, 615, 619, 617, 210/620–628, 629, 150, 151, 324, 325, 198 R, 205, 219, 220, 221.3, 400, 401, 138, 195.3; 261/80, 92

[56] References Cited

U.S. PATENT DOCUMENTS

| | | | |
|---|---|---|---|
| 563,811 | 7/1896 | Scowden | 210/150 |
| 798,908 | 9/1905 | Kremer | 210/150 |
| 1,799,299 | 4/1931 | Johnston | 210/400 |
| 1,971,796 | 8/1934 | Scott | 210/629 |
| 3,980,556 | 9/1976 | Besik | 210/903 |
| 4,008,159 | 2/1977 | Besik | 210/903 |
| 4,026,802 | 5/1977 | Akae | 210/151 |
| 4,153,430 | 5/1979 | Cheng et al. | 261/80 |
| 4,271,026 | 6/1981 | Chen et al. | 210/605 |

Primary Examiner—Peter A. Hruskoci

[57] ABSTRACT

A waste water treatment plant providing biological oxidation, biological nitrification and denitrification and biological removal of phosphorus and clarification of the treated waste water in a single reaction tank in a single suspended growth sludge system without the use of the traditional compressors, surface aerators, mixers, recirculation pumps, sludge scrapers, sludge return pumps, piping and valving.

23 Claims, 5 Drawing Figures

METHOD AND AN APPARATUS FOR BIOLOGICAL TREATMENT OF WASTE WATERS

FIELD OF INVENTION

This invention relates to a system for biological removal of carbonaceous, nitrogenous and phosphorous compounds and suspended solids from waste waters and has for its object a provision of an apparatus capable of an efficient, reliable and unattended maintenance free operation at minimum capital, operational costs and comsumption of energy.

BACKGROUND TO THE INVENTION

Overfertilization of surface waters and degradation of potable water sources in densely populated areas led to pollution control regulations calling for removal of nutrients in the treatment of municipal and industrial waste waters. Consequently, in the biological treatment of waste waters attention is being focused on single-sludge suspended growth system combining the process of carbon oxidation, nitrification, denitrification and removal of phosphorous in one or more reactors without the intermediate clarification and without the addition of external carbon source for denitrification and without addition of chemicals for removal of phosphorus.

It is known, that for a high rate biological removal of carbonaceous, nitrogenous and phosphorous compounds in a single sludge system it is necessary to maintain: (a) a high concentration of mixed microbial population in the biochemical reactor, (b) an efficient contact of the mixed microbial population with the incoming waste water, (c) an efficient mixing of the partially treated waste water with the incoming waste water and with the mixed microbial population for a short period without the dissolved oxygen being present in the reactor mixed liquor and for a short period with the dissolved oxygen being present in the reactor mixed liquor, and (d) a controlled withdrawal of the excess sludge.

To comply with the above process requirements, the current treatment systems utilize biochemical reactors that require compressors and/or surface aerators for mixing and aerating the reactor mixed liquor in the aerobic reaction zones, mechanical mixers for mixing of the reactor mixed liquor in the anoxic zones, pumps for recirculating the reactor mixed liquor between individual zones and clarifiers that require sludge mixers or sludge scrapers and sludge return pumps, piping and valving etc. that make the treatment system operational, but complex and expensive and requiring considerable maintenance.

Therefore, it is the object of this invention to provide an efficient treatment system in which all of the above process requirements could be met and the biological reactions could be carried out reliably at minimum cost and at minimum consumption of energy.

More particularly, it is the object of this invention to provide a biochemical reactor and a clarifier that would provide and reliably maintain the conditions required for a high rate biooxidation of carbonaceous compounds, biological nitrification and denitrification and biological uptake of phosphorus in a single reactor and a single suspended growth sludge system.

It is also the object of this invention to provide a simple and maintenance free biochemical reactor with high energy utilization efficiency in mixing, recirculating and aerating of the reactor mixed liquor without the use of the traditional compressors, surface aerators, mixers and recirculation pumps, that could be constructed from concrete, steel, fiber glass and or other suitable material.

Another object of this invention is to combine the biochemical reactor with a clarifier into a simple treatment system not requiring compressors, pumps, surface aerators, mixers, piping, etc. for reliable operation, that could be easy to scale up or down for use in standardized package plants.

It is another object of this invention to provide a treatment system that would be capable to operate reliably with high concentration of powdered materials, activated carbon, saw dust, or their mixtures present in the system.

Another object of this invention is to provide a system for biological treatment of waste waters capable of cyclic "on-off" operation to permit optimum utilization of energy at batch-wise flow conditions occuring in small package plants and particularly in single house sewage treatment systems.

Other objects and features of the invention will be understood from the accompanying drawings and the following description of claims.

SUMMARY OF THE INVENTION

The present invention provides a biochemical reactor with a new type of mixing of the reactor content permitting operation of the reactor with high concentration of mixed liquor suspended solids, permitting formation of anoxic and aerobic zones within a single reaction tank and providing all process conditions required for biooxidation of carbonaceous material, biological nitrification and denitrification and biological uptake of phosphorus in a single suspended growth sludge system.

The present invention provides a new type of transport of the reactor mixed liquor between the anoxic and aerobic zones automatically formed in the reactor, provides a new type of delivery and dispersion of the air into the reactor mixed liquor, provides a new type of mixing in the formed anoxic and oxic zones thus eliminating the need for the traditional compressors, air diffusers, surface aerators, mixers, pumps and the associated piping and valving.

The present invention permits integration of the biochemical reactor with a clarifier into a treatment system that does not require the traditional sludge return pumps, air lifts, sludge mixers or scrapers, mechanical or air operated skimmers and the associated piping and valving. The treatment system of this invention is therefore simple, its operation reliable, the capital and operational costs reduced and the traditional maintenance eliminated.

The biochemical reactor of this invention with minor adjustment can be also used with the various activated sludge process modifications and the existing activated sludge treatment plants can be modified to utilize the benefits of this invention to reduce maintenance and operational costs, to improve the treatment efficiency and to increase the plant performance.

BRIEF DESCRIPTION OF THE DRAWINGS

The foregoing and other objects and advantages of the present invention will become apparent from the following detailed description which proceeds with reference to the accompanying drawings where in.

DESCRIPTION OF THE PREFERED EMBODIMENTS

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
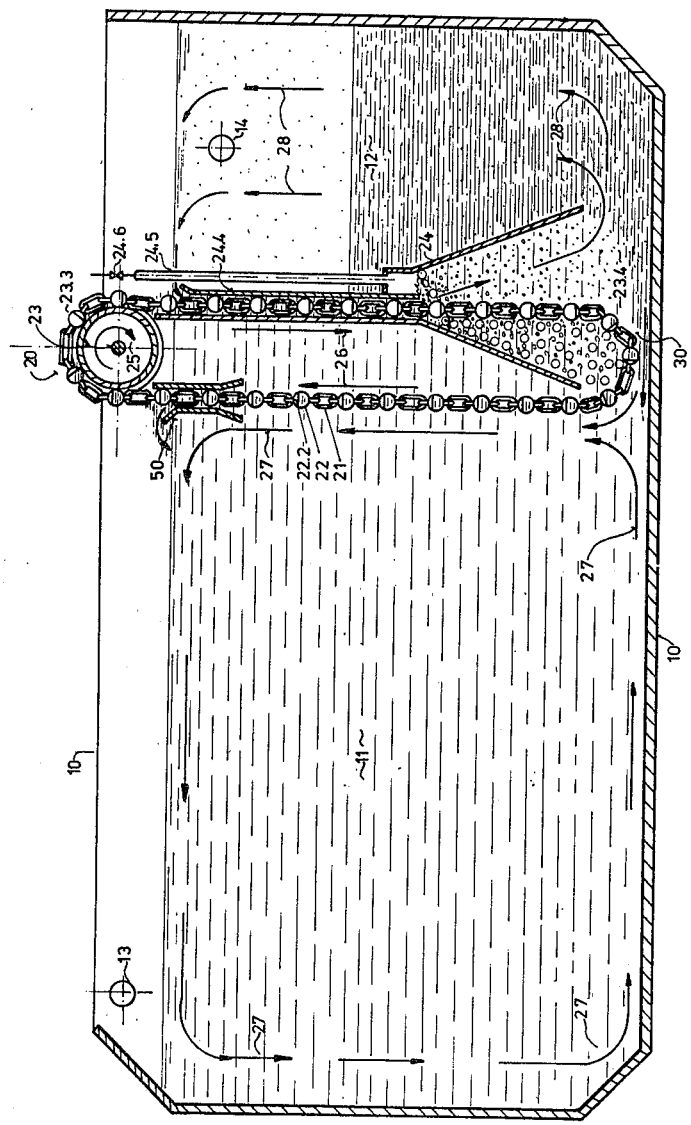
FIG. 1 is a vertical view through one prefered embodiment of the biochemical reactor of this invention.
Figure 2:
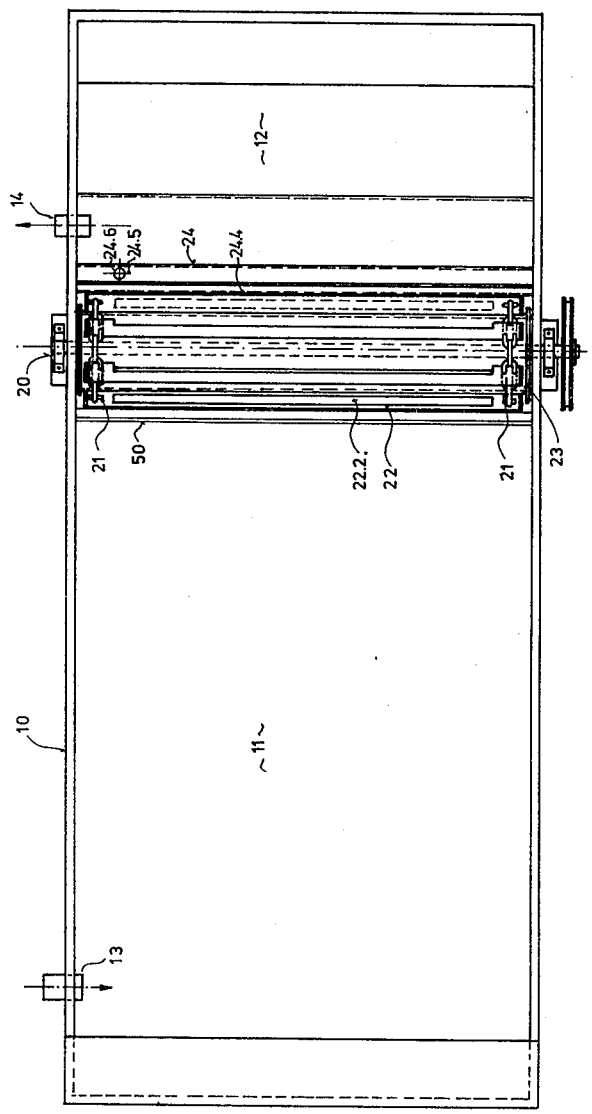
FIG. 2 is a plan view of the biochemical reactor of FIG. 1.

Reference is made first to FIG. 1, 2, for an explanation of one prefered modification of a biochemical reactor of the present invention. As is there shown, the biochemical reactor comprises a reaction tank 10 and a multifunctional device 20. The multifunctional device 20 performs the following functions: (a) it mixes the reactor content, (b) it permits formation and separation of the anoxic zone from the aerobic zone in a single reaction tank, (c) it pumps the reactor mixed liquor from the anoxic zone into the aerobic zone, (d) it recycles the sludge solids from the aerobic zone into the anoxic zone, (e) it pumps and transports the air into the reactor, (f) it permits control and it disperses the air into the reactor mixed liquor, (g) it recirculates the reactor liquor through the aerobic zone, and (g) it maintains fluidized bed of sludge in the aerobic zone, and (h) it creates hydraulic head of the anoxic reactor mixed liquor.

As is shown in FIG. 1,2, the waste water enters the biochemical reactor 10 via pipe 13 and the reactor liquor discharges via pipe 14. However, it is also feasible to operate the reactor in a mode in which the waste water enters via pipe 14 and the reactor liquor discharges via pipe 13. As shown in FIG. 1, 2, the multifunctional device 20 comprises a belt 21 having horizontal chambers 22, a drum 23 and an air dispersion chamber 24 equipped with a throat 24.4 and a standpipe 24.5 with valve 24.6, and throat 50.

When the drum 23 rotates in the direction shown by the arrow 25, the belt 21 with chambers 22 moves in the direction shown by arrows 26. The rotation of the drum 23 can be by an electric motor and is such that the upward and/or downward speed of the belt 21 is in the range between 5 to 100 cm/sec. Preferably the velocity of the belt 21 is maintained in the range from 10 to 50 cm/sec. The belt 21 can be constructed from chain or from rope and the horizontal chambers 22 from pipes, ducts, or other elements. Chambers 22 have openings 22.2 located on the top side when chambers 22 are on the left from drum 23 and on the bottom side when on the right side from the drum and when moving in the direction shown by arrows 26. As chambers 22 on the left from the drum 23 move upward, they force to rotate the reactor content kept in the anoxic zone 11 in the direction shown by arrows 27 thus mixing the sludge solids with the reactor liquor kept in the anoxic zone 11 in the absence of dissolved oxygen therein. At the same time, chambers 22 are filled with the anoxic mixed liquor and as they pass to the right side on the drum 23 at postion 23.3 the content of chambers 22 is emptied via openings 22.2 into the throat 24.4 of the air dispersion chamber 24 and the chambers 22 are filled with air. As chambers 22 continue to move downward and into the reactor liquor the air entrapped in chambers 22 is transported to the bottom of the air dispersion chamber 24. At position 23.4 as chambers 22 and openings 22.2 change position the entrapped air is released from chambers 22, rises through the reactor liquor and accumulates in the top portion of the air dispersion chamber 24. The velocity of the chambers 22 being in the range from 10 to 50 cm/sec, and the recirculated liquor flowing downwardly in the throat 24.4 prevent the air collected in the top portion of the air dispersion chamber 24 to escape through the throat 24.4 out from the air dispersion chamber 24 and the valve 24.6 prevents the air to escape through the standpipe 24.5. The motion of chambers 22 and the velocity of the recirculated reactor liquor causes the air collected in the air dispersion chamber 24 to be continuously dispersed into small bubbles and distributed into the reactor liquor flowing through the air dispersion chamber 24. As the downward velocity of the reactor liquor drops due to increased cross-sectional area of the air dispersion chamber 24 the air bubbles tend to stay within the air dispersion chamber 24 until all of the air is absorbed into the recirculated liquor. In this way substantially all of the oxygen present in the air delivered into the air dispersion chamber 24 by chambers 22 is utilized in the process and therefore none of the used energy is wasted. To control the amount of the oxygen dissolved in the liquor a small portion of the air collected in the air dispersion chamber 24 may be continuously bled off via stand pipe 24.5 and valve 24.6.

As chambers 22 move downward through the throat 24.4 they force to flow the reactor liquor from the top of the aerobic zone 12 through the throat 24.4 downward through the air dispersion chamber 24 and upward through the aerobic zone 12 in the direction shown by arrows 28. Consequently a fluidized bed of sludge solids is automatically formed in the aerobic zone 12 which permits a build up of high concentration of sludge solids in the aerobic zone 12 and subsequently also in the anoxic zone 11. Thus the present invention creates conditions permitting operation of the reactor at high concentration of the activated sludge solids in the reactor liquor.

The anoxic reactor mixed liquor delivered into the aerobic zone 12 by chambers 22 is mixed by the recirculated liquor with the fluidized sludge solids and simultaneously equivalent volume of the fluidized sludge is replaced from the aerobic zone 12 through the opening 30 formed between the open bottom of the air dispersion chamber 24 and the floor of the reactor 10 into the anoxic zone 11.

The continuous recirculation of the reactor liquor and of the sludge solids between the anoxic zone 11 and aerobic zone 12 can be controlled by the rotating drum 23.

It should be apparent that an efficient biochemical reactor can be constructed also without using the air dispersion chamber 24. The throat 50 on the left from drum 23 may be also excluded, or may be used to establish a hydraulic head for flowing the anoxic mixed liquor where needed.

It should be also apparent to those skilled in the art that the biochemical reactor of the present invention can be combined with any standard clarifier into a plant capable of an efficient biological treatment of waste waters.

It should be also apparent that a cyclic operation of the biochemical reactor of the present invention is feasible and can be arranged by a single timer switch controlling the operation of the electric motor rotating the drum 23.

Figure 3:
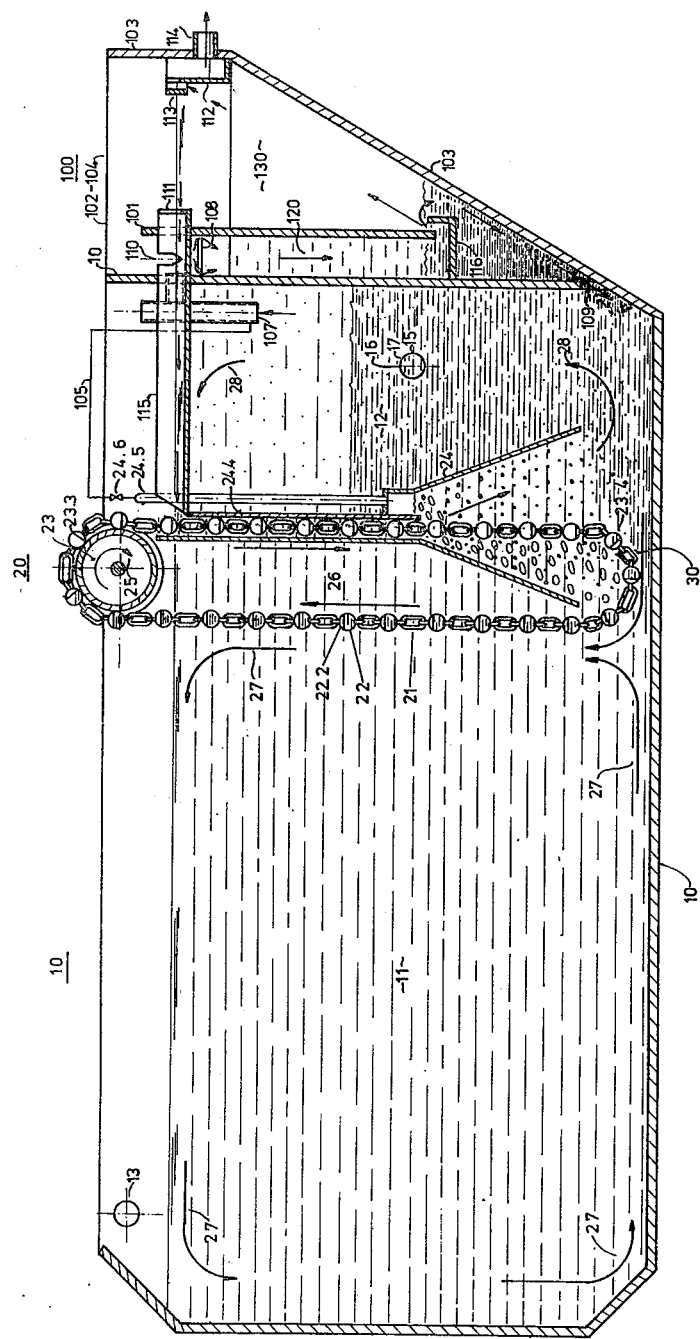
FIG. 3 is a vertical view of one prefered embodiment of an integrated system of this invention.
Figure 4:
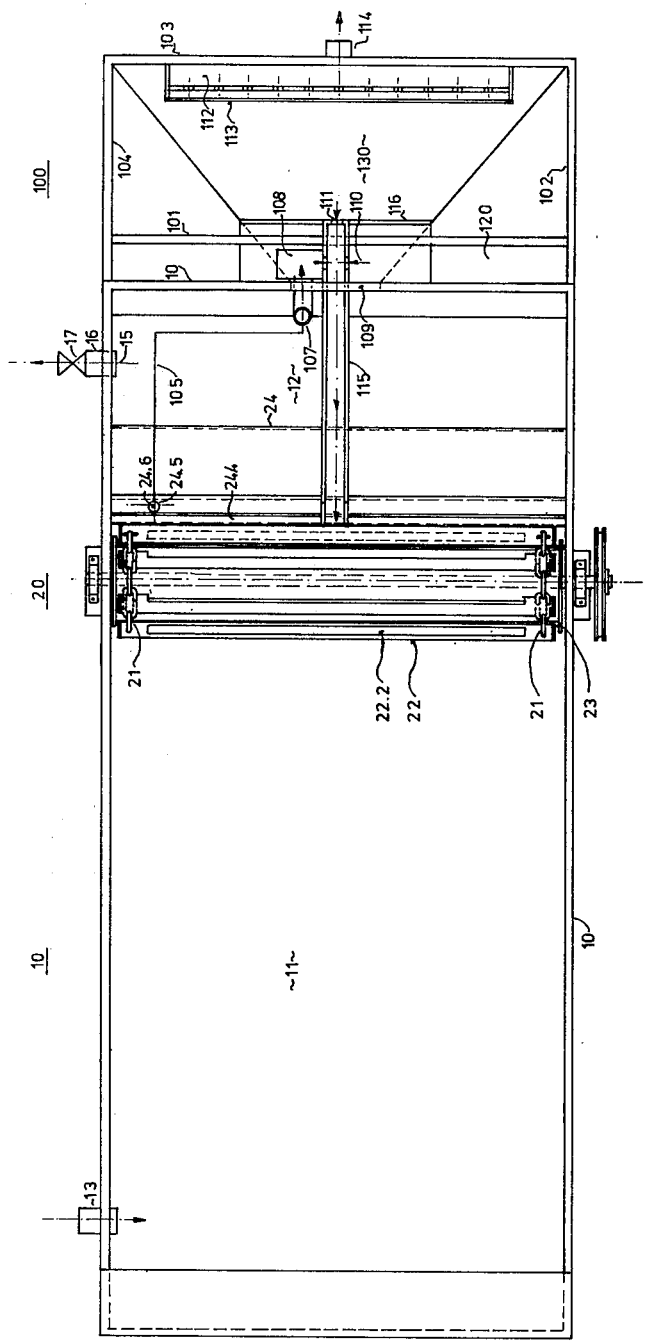
FIG. 4 is a plan view of the integrated system of FIG. 3.

Reference is now made to FIG. 3,4 for explanation of one preferred embodiment of the present invention wherein the biochemical reactor of this invention is combined with a clarifier into an integrated system for the treatment of waste waters.

To achieve efficient separation of floatable and settleable solids present in the reactor mixed liquor from the treated waste water it is necessary to maintain a continuous flow of the two types of solids through the clarifier. In the current art systems these conditions are met by: (a) continuously scraping the settled sludge solids by mechanical sludge scrapers, (b) continuously recirculating the sludge solids between the clarifier and the reactor by sludge return pumps or by airlifts and (c) by continuous skimming of the floatable solids in the clarifiers by mechanical or air lift operated skimmers.

In the treatment system of the present invention all process conditions for efficient biological treatment and clarification of the treated waste water are met without the need for any such auxiliary equipment. As shown in FIG. 3,4 in one preferred embodiment of this invention the clarifier 100 is located on the outside of the aerobic zone 12 utilizing one side wall of the reactor 10. It should be apparent to those skilled in the art that such clarifier can be located also inside the aerobic zone 12, or inside the anoxic zone 11, or outside the anoxic zone 11.

As shown in FIG. 3,4 waste water enters into the reactor via pipe 13 and the treated waste water discharges from the clarifier via pipe 114. A continuous recirculation of floatable and settleable solids through clarifier 100 is insured by continuously flowing a small portion of the reactor liquor withdrawn from the aerobic zone 12 via pipe 107 into the flocculation chamber 120 of the clarifier 100. Compressed air collected in the standpipe 24.5 may be fed by line 105 into pipe 107 if control of the treated waste water through the clarifier 100 is desired and a baffle 108 is provided to prevent mixing of the flocculated sludge solids in chamber 120 formed by the side wall of the reactor 10, walls 102, 104 and partition 101 of the clarifier 100. Most of the floatable solids present in the mixed liquor are separated in chamber 120 and are continuously returned back into the reactor 10 with a small portion of the liquor via openings 110 located in channel 115 of the clarifier 100. As the aerobic liquor moves downward in chamber 120 the biological solids flocculate and the formed flocc entrapps the colloidal particles present in the treated waste water. Baffle 116 maintains a bed of flocculated sludge solids under partition 101 under which the treated waste water flows together with the formed flocc into chamber 130 formed by walls 102, 103 and 104 and partition 101 of the clarifier 100. The treated waste water flows through the continuously moving bed of flocculated sludge solids, then upward in chamber 130 to be collected in the weir 112. Baffle 113 prevents floatable solids to enter the weir 112 and opening 111 located in channel 115 permits to recycle the floating solids from chamber 130 back into reactor 10. The flocculated sludge solids move horizontally across chamber 130 to wall 103, then slide on the wall 103 downward and finally flow out of chamber 130 with a small portion of the liquor via opening 109 located in the side wall of the reactor 10 into the aerobic zone 12. Sloping of the walls of the clarifier 100 is such that a continuous reliable movement of the sludge solids through the clarifier is insured without the need for a mechanical sludge scraper.

The excess sludge may be withdrawn from the reactor 10 for further treatment and disposal via opening 15 located in the side wall of the reactor 10, pipe 16 and valve 17.

OPERATION

The operation of the aforedescribed treatment system and the method of the biological treatment used therein consists of the following:

(a) feeding the waste water via inlet 13 into the anoxic zone 11 of the reactor 10, continuously rotating the content in this zone by the multifunctional device 20, and continuously contacting the waste water with the rotating sludge solids in the absence of dissolved oxygen therein, (b) continuously pumping a predetermined volume of the mixed liquor from the anoxic zone 11 by chambers 22 into the air dispersion chamber 24 and from there into the aerobic zone 12 and simultaneously flowing by gravity an equivalent volume of sludge from the aerobic zone 12 back into the anoxic zone 11 via opening 30, (c) continuously recirculating the reactor liquor from the top of the aerobic zone 12 downward through the air dispersion chamber 24 then upward through the aerobic zone 12 to maintain a fluidized bed of sludge solids in aerobic zone 12 and contacting the waste water with the fluidized activated sludge solids in the presence of dissolved oxygen therein, (d) continuously pumping air by chambers 22 into the air dispersion chamber 24, continuously dispersing the air in the air dispersion chamber and aerating the reactor liquor recirculating therethrough, (e) continuously flowing via pipe 107 a portion of the reactor liquor withdrawn from the aerobic zone 12 into the clarifier 100, (f) continuously flocculating the sludge solids in the clarifier and separating the sludge solids from the treated waste water therein by filtration through a continuously moving bed of flocculated sludge solids, (g) continuously flowing the flocculated sludge solids by gravity via opening 109 and the floating solids with small portion of the clarified waste water via openings 110 and 111 back into the reactor 10 to maintain the biological activity in the reactor to insure high degree of biological treatment of waste water, (h) continuously withdrawing the excess biological solids out of the reactor via opening 15, pipe 16 and valve 17, and (i) continuously flowing the biologically treated and clarified waste water via weir 112 and pipe 114 out of the treatment system.

It should be also apparent to those skilled in the art that eliminating the air dispersion chamber 24 and modifying the openings 22.2 of chambers 22 the operating conditions in the biochemical reactor would also substantially change. In such situation it is possible to maintain the reaction zone 12 aerobic but with the content being completely mixed and without the fluidized bed of sludge solids therein. Consequently the operating method of such a system could be considered as substantially different from that described above.

It should be also apparent to those skilled in the art that the incoming waste water could be fed into the reactor into the aerobic zone 12 via pipe 14 with the clarifier receiving the reactor mixed liquor from anoxic zone 11 via pipe 13. Such treatment could be also considered as different from those described above.

It should be also apparent to those skilled in the art that all the above described treatment methods could be further modified by operating the multifunctional device 20 in a cyclic "on-off" mode.

Figure 5:
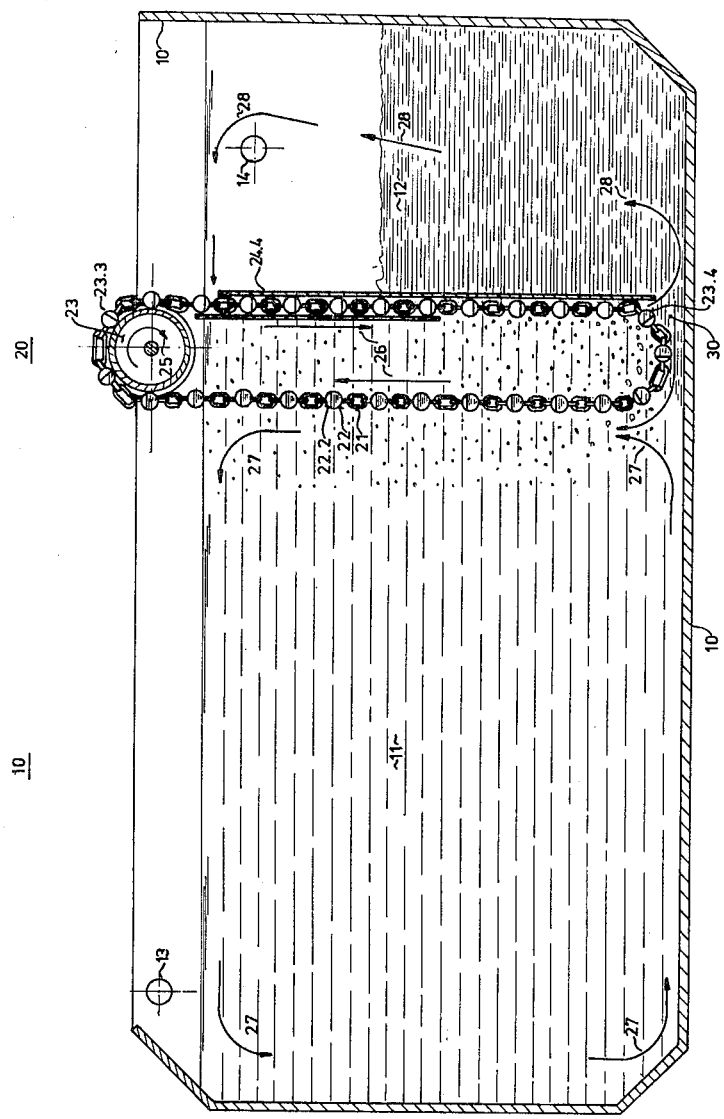
FIG. 5 is a vertical view through another prefered embodiment of a biochemical reactor of this invention.

Reference is now made to FIG. 5 showing another prefered embodiment of the present invention in which the air dispersion chamber 24 is excluded and the throat 24.4 is extended. This modification of the multifunctional device 20 will provide a biochemical reactor with two reaction zones, the first reaction zone 11 being substantially saturated with dissolved oxygen with the content in this zone rotating in the direction shown by arrows 27, the second reaction zone 12 being substantially without dissolved oxygen present in the reactor liquor with the reactor liquor circulating from top of reaction zone 12 downward through throat 24.4 and upward through zone 12 as shown by arrows 28 and maintaining a fluidized bed of sludge solids therein. The openings 22.2 in chambers 22 may be modified to improve dispersion of the entrapped air at point 23.4 where chambers 22 and openings 22.2 change position and where the air is released from chambers 22 and dispersed into the rotating liquor.

The incoming waste water may be fed into the aerobic zone 11 via pipe 13 and the reactor liquor may be discharged from the anoxic zone 12 via pipe 14. It is also apparent that it is feasible to feed the incoming waste water into the fluidized bed maintained in the anoxic zone 12 via pipe 14 and discharge the reactor effluent from the aerobic zone 11 via pipe 13.

It should be also apparent that the described embodiment of the biochemical reactor of this invention can be combined with any clarifier into a plant capable of efficient biochemical treatment of waste waters with the clarifier receiving the reactor effluent either from the aerobic zone 11 or from the anoxic zone 12.

It should be also apparent to those skilled in the art that such a plant could be operating with the belt 21 moving either continuously or in a cyclic "on-off" mode.

It should be also apparent to those skilled in the art that the treatment methods utilizing the above described embodiments of this invention could be considered as substantially different from those described previously.

Although all the above described embodiments of this invention relate to a system utilizing a biochemical reactor with two or three substantially different reaction zones, it should be apparent to those skilled in the art that by excluding the throat 24.4 and modifying the shape and/or location of openings 22.2 of chambers 22, or changing the direction of rotation of the drum 23 it is feasible to provide also a biochemical reactor with a single reaction zone with completely mixed and aerated content therein for use with the established activated sladge process and/or the various activated sludge process modifications.

All of the described suspended growth systems and the associated treatments do not require the traditional compressors and air diffusers or surface aerators for aeration of the reactor content, do not require the traditional mixers to maintain the biological activity in the denitrifying stages of the treatment, do not require the traditional pumps for recirculation of the reactor liquor between the aerobic and anoxic zones, do not require the traditional sludge return pumps, sludge scrapers, mechanical or air lift operated skimmers et. as common in all current art systems. In the described treatment systems there is no equipment or parts to fail and therefore the described treatment systems and the associated treatment methods are exceptionally reliable. It is also apparent to those skilled in the art that due to the simplicity of the invented apparatus the capital costs and the operational costs for such described biological treatments will be considerably below the costs of the current art treatments.

It is also apparent that if further treatment of the clarified waste water is required such can be provided by existing tertiary treatments.

Having described the prefered embodiments of my invention, it should be apparent to those skilled in the art that the same permits of modification in arrangement and detail. I claim as my invention all such modifications as come within the true spirit and scope of the following claims.

I claim:
1. A method for treating waste waters comprising mixing the content of a single reaction tank by single aerating means in three substantially different reaction zones, the first reaction zone being substantially without dissolved oxygen, the second reaction zone being substantially saturated with dissolved oxygen, the third reaction zone being substantially saturated with dissolved oxygen and having a fluidized bed of activated sludge therein, said aerating means comprising a pair of endless chain means arranged at opposite sides of said reaction tank, said chain means being positioned within said reaction tank with the top portion of said chain means located above the top part of said reaction tank and the bottom portion of said chain means extending near the bottom of said reaction tank, said chain means having plurality of horizontal pipe means attached to and extending between said chain means, said chain means forming with said pipe means an endless belt means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means and said belt support means being rotated by motor means, said reaction tank including first solid wall partition and second solid wall partition, said first partition being positioned inside said belt means and being attached to two side walls of said reaction tank separating said reaction tank into first and third reaction zones, said second partition being positioned in parallel with said first partition alongside said belt means in said third reaction zone, said second partition in its lower portion being bent outwardly to form a funnel shaped aeration zone between said first partition and said second partition for aerating the reactor liquor, said second partition being attached to two side walls of said reaction tank and being submerged in the liquid held in said third reaction zone, said first and third reaction zones being in communication with each other under said funnel shaped aeration zone via openings formed by the bottoms of said first and second partitions, said two side walls and the bottom of said reaction tank, said belt means being arranged to move around said first partition and downwardly in the space between said first and second partitions and upwardly in said first reaction zone, said belt means recirculating the liquid from the top of said third reaction zone downwardly in the space between said first and second partitions to the bottom of said reaction tank and then upwardly through said third reaction zone to maintain a fluidized bed of sludge solids therein and said belt means being arranged to pump and disperse air into the reactor liquor in said funnel shaped aeration zone, rotate the content in said first reaction zone and circulate the reactor mixed liquor between said first reaction zone and said second reaction zone, feeding the waste water into said first reaction zone, continuously rotating by said aerating means the content therein and contacting the waste water with activated sludge solids in the absence of dissolved oxygen therein, continuously flowing the reactor mixed liquor by gravity and by said aerating means from said first reaction zone into said aeration zone and from said aeration zone into said third reaction zone, continuously recirculating the reactor liquor by said aerating means from the top of said third reaction zone downward through said aeration zone, maintaining a fluidized bed of sludge solids in said third reaction zone and contacting the waste water with the fluidized activated sludge solids in said third reaction zone in presence of dissolved oxygen therein, continuously pumping by said aerating means sludge solids and the reactor liquor from said aeration zone into said first reaction zone, continuously pumping air by said aerating means into said aeration zone and continuously dispersing the air by said aerating means into the reactor liquor therein, continuously flowing the reactor liquor from said third reaction zone into a clarifier for separating the sludge solids from the treated waste water, continuously returning the separated sludge solids from said clarifier back into said reaction tank and the clarified waste water flowing out of said clarifier for further treatment or disposal, and continuously withdrawing the excess sludge out of the system.

2. A method according to claim 1 with said aerating means operating in a cyclic "on-off" mode.

3. A method for treating waste waters comprising mixing the content of a single reaction tank by single aerating means in three substantially different reaction zones, the first reaction zone being substantially without dissolved oxygen, the second aeration zone being substantially saturated with dissolved oxygen, the third reaction zone being substantially saturated with dissolved oxygen and having a fluidized bed of activated sludge solids therein, said aerating means comprising a pair of endless chain means arranged at opposite sides of said reaction tank, said chain means being positioned within said reaction tank with the top portion of said chain means located above the top part of said reaction tank and the bottom portion of said chain means extending near the bottom of said reaction tank, said chain means having plurality of horizontal pipe means attached to and extending between said chain means, said chain means forming with said pipe means an endless belt means, said pipe means (being equipped with openings on the top side thereof for flowing air and waste water into said pipe means and openings on the bottom thereof for flowing air and waste water out of said pipe means) being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being held in position by belt support means, said belt means and said belt support means being rotated by motor means, said reaction tank including first solid wall partition and second solid wall partition, said first partition being positioned inside said belt means and being attached to two side walls of said reaction tank separating said reaction tank into first and third reaction zones, said second partition being positioned in parallel with said first partition alongside said belt means in said third reaction zone, said second partition in its lower portion being bent outwardly to form a funnel shaped aeration zone between said first partition and said second partition for aerating the reactor liquor, said second partition being attached to two side walls of said reaction tank and being submerged in the liquid held in said third reaction zone, said first and third reaction zones being in communication with each other under said funnel shaped aeration zone via openings formed by the bottoms of said first and second partitions, said two side walls and the bottom of said reaction tank, said belt means being arranged to move around said first partition and downwardly in the space between said first and second partitions and upwardly in said first reaction zone, said belt means recirculating the liquid from the top of said third reaction zone downwardly in the space between said first and second partitions to the bottom of said reaction tank and then upwardly through said third reaction zone to maintain a fluidized bed of sludge solids therein and said belt means being arranged to pump and disperse air into the reactor liquor in said funnel shaped aeration zone, rotate the content in said first reaction zone and circulate the reactor liquor between said first reaction zone and said aeration zone, feeding the waste water into said third reaction zone, continuously recirculating the reactor liquor by said aerating means from the top of said third reaction zone downward through said aeration zone then upward through said third reaction zone to maintain a fluidized bed of sludge solids in said third reaction zone and contacting the waste water with the fluidized activated sludge solids in said third reaction zone in presence of dissolved oxygen therein, continuously flowing by gravity and by said aerating means sludge solids and the reactor liquor from said aeration zone into said first reaction zone, continuously rotating by said aerating means the content in said first reaction zone and contacting the reactor liquor with activated sludge solids in the absence of dissolved oxygen therein, continuously pumping by said aerating means the reactor liquor from said first reaction zone into said aeration zone and from said aeration zone into said third reaction zone, continuously pumping air by said aerating means into said aeration zone and continuously dispersing the air by said aerating means into the reactor liquor therein, continuously flowing the reactor mixed liquor from said first reaction zone into a clarifier for separating the sludge solids from the treated waste water, continuously returning the separated sludge solids from said clarifier back into said reaction tank and flowing the clarified waste water out of said clarifier for further treatment or disposal, and continuously withdrawing the excess sludge out of the system.

4. A method according to claim 3 with said aerating means operating in a cyclic "on-off" mode.

5. A method for treatment of waste waters comprising mixing the content of a single reaction tank by aerating means in two substantially different reaction zones, the first reaction zone being substantially without dissolved oxygen, the second reaction zone being substantially saturated with dissolved oxygen, said aerating means comprising a pair of endless chain means arranged at opposite sides of said reaction tank, said chain means being positioned within said reaction tank with the top portion of said chain means located above the top part of said reaction tank and the bottom portion of said chain means extending near the bottom of said reaction tank, said chain means having plurality of horizontal pipe means attached to and extending between said chain means, said chain means forming with said pipe means an endless belt means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being held in position by belt support means, said belt means and said belt support means being rotated by motor means, said reaction tank including a solid wall partition, said partition being positioned inside said belt means and being attached to two side walls of said reaction tank, said partition separating said reaction tank into first and second reaction zones, said first and second reaction zones being in communication with each other via an opening formed by the bottom of said partition, said two side walls and the bottom of said reaction tank, said belt means being arranged to move around said partition downwardly in said second reaction zone and upwardly in said first reaction zone, said belt means being arranged to pump and disperse air into said second reaction zone, mix the content therein and rotate the content in said first reaction zone and circulate the reactor liquor between said first reaction zone and said second reaction zone, feeding the waste water into said first reaction zone and continuously rotating by said aerating means the content in said first reaction zone and contacting the waste water with activated sludge solids therein in the absence of dissolved oxygen therein, continuously flowing by gravity and by said aerating means the reactor mixed liquor from said first reaction zone into said second reaction zone and aerating the reactor mixed liquor by said aerating means therein, continuously pumping by said aerating means the reactor mixed liquor from said second reaction zone into said first reaction zone, continuously flowing the reactor mixed liquor from said second reaction zone into a clarifier for separating the sludge solids from the treated waste water, continuously returning the separated sludge solids from said clarifier back into said reaction tank and the clarified waste water flowing out of said clarifier for further treatment or disposal, and withdrawing the excess sludge out of the system.

6. A method according to claim 5 with said aerating means operating in a cyclic "on-off" mode.

7. A method for treatment of waste waters comprising mixing the content of a single reaction tank by aerating means in two substantially different reaction zones, the first reaction zone being substantially without dissolved oxygen, the second reaction zone being substantially saturated with dissolved oxygen, said aerating means comprising a pair of endless chain means arranged at opposite sides of said reaction tank with the top portion of said chain means located above the top part of said reaction tank and the bottom portion of said chain means extending near the bottom of said reaction tank, said chain means having a plurality of horizontal pipe means attached to and extending between said chain means, said chain means forming with said pipe means an endless belt means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being held in position by belt support means, said belt means and said belt support means being rotated by motor means, said reaction tank including a solid wall partition, said partition being positioned inside said belt means and being attached to two side walls of said reaction tank, said partition separating said reaction tank into first and second reaction zones, said first and second reaction zones being in communication with each other via an opening formed by the bottom of said partition, said two side walls and the bottom of said reaction tank, said belt means being arranged to move around said partition downwardly in said second reaction zone and upwardly in said first reaction zone, said belt means being arranged to pump and disperse air into said second reaction zone, mix the content therein and rotate the content in said first reaction zone and circulate the reactor liquor between said first reaction zone and said second reaction zone, feeding the waste water into said second reaction zone, mixing and aerating the content in said second reaction zone by said aerating means and contacting the waste water with activated sludge solids therein in the presence of dissolved oxygen, continuously flowing by gravity and by said aerating means the reactor liquor from said second reaction zone into said first reaction zone, continuously rotating by said aerating means the content in said first reaction zone and contacting the reactor liquor with activated sludge solids therein in the absence of dissolved oxygen, continuously pumping by said aerating means the reactor mixed liquor from said first reaction zone into said second reaction zone, continuously flowing the reactor mixed liquor from said first reaction zone into a clarifier for separating the sludge solids from the treated waste water, continuously returning the separated sludge solids from said clarifier back into said reaction tank and flowing the clarified waste water out of said clarifier for further treatment, and withdrawing the excess sludge out of the system.

8. A method according to claim 7 with said aerating means operating in a cyclic "on-off" mode.

9. A method for treating waste water comprising mixing the content of a single reaction tank by aerating means in two substantially different reaction zones, the first reaction zone being substantially saturated with dissolved oxygen, the second reaction zone being substantially without dissolved oxygen and having a fluidized bed of activated sludge solids therein, said aerating means comprising a pair of endless chain means arranged at opposite sides of said reaction tank with the top portion of said chain means located above the top part of said reaction tank and the bottom portion of said chain means extending near the bottom of said reaction tank, said chain means having a plurality of horizontal pipe means attached to and extending between said chain means, said chain means forming with said pipe means an endless belt means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being held in position by belt support means, said belt means and said belt support means being rotated by motor means, said reaction tank including first solid wall partition and second solid wall partition, said first partition being positioned inside said belt means and being attached to two side walls of said reaction tank separating said reaction tank into first and second reaction zones, said second partition being positioned in parallel with said first partition alongside said belt means in said second reaction zone, said second partition being attached to two side walls of said reaction tank and being submerged in the liquid held in said second reaction zone, said first and second reaction zones being in communication with each other via openings formed by the bottoms of said first and second partitions, said two side walls and the bottom of said reaction tank, said belt means being arranged to move around said first partition and downwardly in the space between said first and second partitions and upwardly in said first reaction zone, said belt means being arranged to recirculate the liquid from the top of said second reaction zone downwardly in the space between said first and second partitions to the bottom of said reaction tank and then upwardly through said second reaction zone to maintain a fluidized bed of sludge solids therein, and said belt means being arranged to pump and disperse air into said first reaction zone, rotate the content in said first reaction zone and circulate the reactor mixed liquor between said first reaction zone and said second reaction zone, feeding the waste water into said second reaction zone, recirculating the reactor liquor by said aerating means from top of said second reaction zone to the bottom and then upward through said second reaction zone, maintaining a fluidized bed of sludge solids in said second reaction zone and contacting the waste water with fluidized sludge solids in the absence of dissolved oxygen therein, continuously flowing by gravity and by said aerating means the reactor liquor and sludge solids from said second reaction zone into said first reaction zone, continuously rotating the content in said first reaction zone by said aerating means and contacting the reactor liquor with activated sludge solids in the presence of dissolved oxygen therein, continuously pumping by said aerating means the reactor mixed liquor from said first reaction zone into said second reaction zone, continuously pumping air by said aerating means into said first reaction zone and continuously dispersing the air by said aerating means into the reactor liquor therein, continuously flowing the reactor liquor from said first reaction zone into a clarifier for separating the sludge solids from the treated waste water, continuously returning the separated sludge solids from said clarifier back into said reaction tank and flowing the clarified waste water out of said clarifier for further treatment or disposal, and withdrawing the excess sludge out of the system.

10. A method according to claim 9 with said aerating means operating in a cyclic "on-off" mode.

11. A method for treating waste waters comprising mixing the content of a single reaction tank by aerating means in two substantially different reaction zones, the first reaction zone being substantially saturated with dissolved oxygen, the second reaction zone being substantially without dissolved oxygen and having a fluidized bed of activated sludge solids therein, said aerating means comprising a pair of endless chain means arranged at opposite sides of said reaction tank with the top portion of said chain means located above the top part of said reaction tank and the bottom portion of said chain means extending near the bottom of said reaction tank, said chain means having a plurality of horizontal pipe means attached to and extending between said chain means, said chain means forming with said pipe means an endless belt means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being held in position by belt support means, said belt means and said belt support means being rotated by motor means, said reaction tank including first solid wall partition and second solid wall partition, said first partition being positioned inside said belt means and being attached to two sides walls of said reaction tank separating said reaction tank into first and second reaction zones, said second partition being positioned in parallel with said first partition alongside said belt means in said second reaction zone, said second partition being attached to two side walls of said reaction tank and being submerged in the liquid held in said second reaction zone, said first and second reaction zone being in communication with each other via openings formed by the bottoms of said first and second partitions, said two side walls and the bottom of said reaction tank, said belt means being arranged to move around said first partition and downwardly in the space between said first and second partitions and upwardly in said first reaction zone, said belt means being arranged to recirculate the liquid from the top of said second reaction zone downwardly in the space between said first and second partitions to the bottom of said reaction tank and then upwardly through said second reaction zone to maintain a fluidized bed of sludge solids therein, and said belt means being arranged to pump and disperse air into said first reaction zone, rotate the content in said first reaction zone and circulate the reactor mixed liquor between said first reaction zone and said second reaction zone, feeding the waste water into said first reaction zone, continuously rotating by said aerating means the content of said first reaction zone and contacting the waste water with activated sludge solids in the presence of dissolved oxygen therein, continuously flowing by gravity and by said aerating means the reactor mixed liquor from said first reaction zone into said second reaction zone, continuously recirculating by said aerating means the reactor liquor from top of said second reaction zone to the bottom and then upward through said second reaction zone, maintaining a fluidized bed of sludge solids in said second reaction zone and contacting the reactor liquor with fluidized sludge solids in the absence of dissolved oxygen therein, continuously pumping by said aerating means sludge solids and the reactor liquor from said second reaction zone into said first reaction zone, continuously pumping air by said aerating means into said first reaction zone and continuously dispersing the air by said aerating means into the reactor liquor therein, continuously flowing the reactor liquor from said second reaction zone into a clarifier for separating the sludge solids from the treated waste water, continuously returning the separated sludge solids from said clarifier into said reaction tank and flowing the clarified waste water out of said clarifier for further treatment or disposal, and withdrawing the excess sludge out of the system.

12. A method according to claim 11 with said aerating means operating in a cyclic "on-off" mode.

13. Apparatus for the biological treatment of waste waters including means defining a reaction tank, waste water inlet means for introducing waste water into said reaction tank, aerating means located in said reaction tank, said aerating means comprising a pair of endless chain means arranged at opposite sides of said reaction tank, said chain means being positioned within said reaction tank with top portion of said chain means located above the top part of said reaction tank and the bottom portion of said chain means extending near the bottom of said reaction tank said chain means having plurality of horizontal pipe means attached to and extending between said chain means, said chain means forming with said pipe means an endless belt means, said pipe mean being a chamber having openings located along their length thereof for flowing the reactor liquor out and for entering the air into said pipe means when said pipe means are located above the top of said reaction tank and for releasing of the entrapped air from said pipe means in form of bubbles into said reactor mixed liquor when said pipe means are submerged in said reactor mixed liquor and said endless belt is moving downwardly in said reaction tank, said endless belt mixing the contents of said reaction tank and said endless belt dispersing said air bubbles released from said pipe means through out said reactor mixed liquor held in said reaction tank, said belt means being held in position by belt support means, said belt means and said belt support means being rotated by motor means, said reaction tank being of a design forming a single reaction zone with the content therein being mixed and aerated by said endless belt means, and said reaction tank being equipped with means for discharging the waste water.

14. Apparatus according to claim 13 comprising in addition clarification means for separating the suspended solids from the reactor mixed liquor and for clarifying the treated waste water and said clarification means being equipped with means for returning the separated sludge solids back into said reaction tank, means for withdrawing the excess sludge and means for flowing the clarified effluent out of the apparatus.

15. Apparatus according to claim 14 with said clarification means being integrated with said reaction tank, said clarification means including means defining a flocculating chamber, means for flowing the reactor liquor into said flocculating chamber, means for flowing the flocculated solids back into said reaction tank, means defining clear well and clarified effluent discharging means.

16. Apparatus according to claim 15 comprising in addition means for disinfection of the biologically treated and clarified waste water.

17. Apparatus according to claim 15 comprising in addition a timer switch means operating said aerating means in a cyclic "on-off" mode.

18. Apparatus according to claim 14 comprising in addition means for disinfection of the biologically treated and clarified waste water.

19. Apparatus according to claim 14 comprising in addition a timer switch means operating said aerating means in a cyclic "on-off" mode.

20. Apparatus according to claim 13 with said reaction tank comprising in addition a solid wall partition, said partition being positioned inside said belt means and being attached to two side walls of said reaction tank, said partition separating said reaction tank into first and second reaction zones, said first and second reaction zones being in communication with each other via an opening formed by the bottom of said partition, two side walls and the bottom of said reaction tank, said belt means being arranged to move around said partition downwardly in said second reaction zone and upwardly in said first reaction zone and said belt means being arranged to pump and disperse air into said second reaction zone, mix the content therein and rotate the content in said first reaction zone and circulate the reactor mixed liquor between said first reaction zone and said second reaction zone.

21. Apparatus according the claim 13 with said reaction tank comprising in addition a solid wall partition, said partition being positioned inside said belt means and being attached to two side walls of said reaction tank, said partition separating said reaction tank into first and second reaction zones, said first and second reaction zones being in communication with each other via an opening formed by the bottom of said partition, said two side walls and the bottom of said reaction tank, said belt means being arranged to move around said partition downwardly in said second reaction zone and upwardly in said first reaction zone and said belt means being arranged to pump and disperse air into said first reaction zone, rotate the content therein and mix the content in said second reaction zone and circulate the reactor mixed liquor between said first reaction zone and said second reaction zone.

22. Apparatus according to claim 13 with said reaction tank comprising in addition first solid wall partition and second solid wall partition, said first partition being positioned inside said belt means and being attached to two side walls of said reaction tank separating said reaction tank into first and second reaction zones, said second partition being positioned in parallel with said first partition alongside said belt means in said second reaction zone, said second partition being attached to two side walls of said reaction tank and being submerged in the liquid held in said second reaction zone, said first and second reaction zones being in communication with each other via openings formed by the bottoms of said first and second partitions, said two side walls and the bottom of said reaction tank, said belt means being arranged to move around said first partition and downwardly in the space between said first and second partitions and upwardly in said first reaction zone, said belt means being arranged to recirculate the liquid from the top of said second reaction zone downwardly in the space between said first and second partitions to the bottom of said reaction tank and then upwardly through said second reaction zone to maintain a fluidized bed of sludge solids therein and said belt means being arranged to pump and disperse air into said first reaction zone, rotate the content in said first reaction zone and circulate the reactor mixed liquor between said first reaction zone and second reaction zone.

23. Apparatus according to claim 13 with said reaction tank comprising in addition first solid wall partition and second solid wall partition, said first partition being positioned inside said belt means and being attached to two side walls of said reaction tank separating said reaction tank into first and third reaction zones, said second partition being positioned in parallel with said first partition alongside said belt means in said third reaction zone, said second partition in its lower portion being bent outwardly to form a funnel shaped aeration zone between said first partition and said second partition for aerating the reactor liquor, said second partition being attached to two side walls of said reaction tank and being submerged in the liquid held in said third reaction zone, said first and third reaction zones being in communication with each other under said funnel shaped aeration zone via openings formed by the bottoms of said first and second partitions, said two side walls and the bottom of said reaction tank, said belt means being arranged to move around said first partition and downwardly in the space between said first and second partitions and upwardly in said first reaction zone, said belt means being arranged to recirculate the liquid from the top of said third reaction zone downwardly in the space between said first and second partitions to the bottom of said reaction tank and then upwardly through said third reaction zone to maintain a fluidized bed of sludge solids therein and said belt means being arranged to pump and disperse air into the reactor liquor in said funnel shaped aeration zone, rotate the content in said first reaction zone and circulate the reactor mixed liquor between said first reaction zone and said aeration zone.

* * * * *